United States Patent [19]

Pardee

[11] Patent Number: 5,285,882

[45] Date of Patent: Feb. 15, 1994

[54] CLUTCH WITH SPACER FOR SUPPORTING A BEARING

[75] Inventor: James A. Pardee, Janesville, Wis.

[73] Assignee: Dana Corporation, Toledo, Ohio

[21] Appl. No.: 996,122

[22] Filed: Dec. 23, 1992

[51] Int. Cl.⁵ .......................................... F16D 27/112
[52] U.S. Cl. ............................... 192/84 C; 192/110 B
[58] Field of Search ................ 192/18 B, 84 C, 110 B

[56] References Cited

U.S. PATENT DOCUMENTS

| | | | |
|---|---|---|---|
| 3,036,679 | 5/1962 | Millington et al. | 192/84 C |
| 3,263,784 | 8/1966 | Pierce | 192/84 C X |
| 4,397,380 | 8/1983 | Yew | 192/84 C |
| 4,909,369 | 3/1990 | Bausch | 192/84 C |
| 5,119,918 | 6/1992 | Pardee | 192/18 B |

FOREIGN PATENT DOCUMENTS 54-20258  2/1979  Japan ................ 192/84 C
55-24269  2/1980  Japan ................ 192/84 C

OTHER PUBLICATIONS

Warner Electric Invention Record No. 1423 (2 pages), dated Oct. 31, 1988.

Primary Examiner—Richard M. Lorence
Attorney, Agent, or Firm—Leydig, Voit & Mayer

[57] ABSTRACT

The clutch includes an input hub keyed to a drive shaft, a spacer telescoped into and keyed to the input hub, a bearing telescoped over and supported radially on the spacer, and an output member supported by the bearing. A bolt is threaded into the drive shaft and, when tightened, causes the bearing to be clamped axially between the spacer and the input hub. The spacer is formed with flats adapted to be engaged by a wrench in order to prevent the spacer, the input hub and the drive shaft from turning when the bolt is tightened.

6 Claims, 2 Drawing Sheets

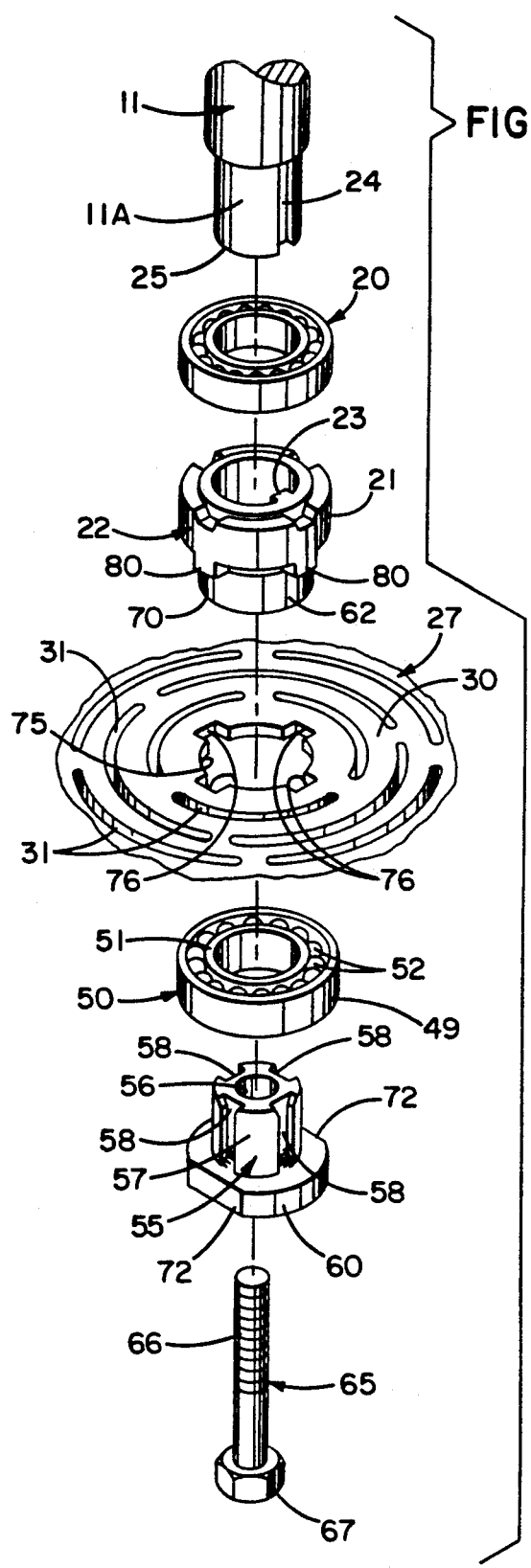
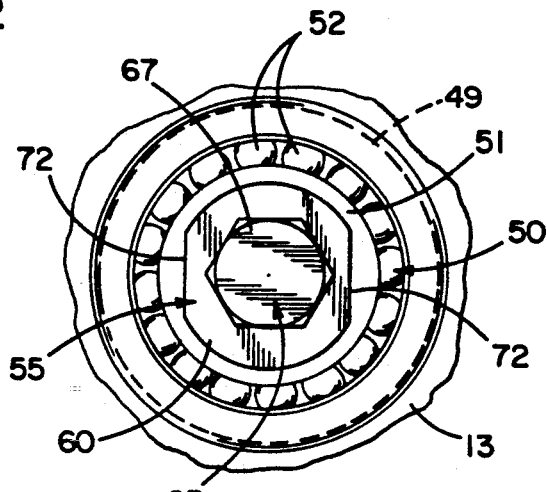
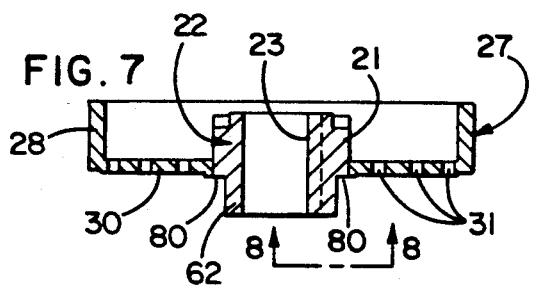
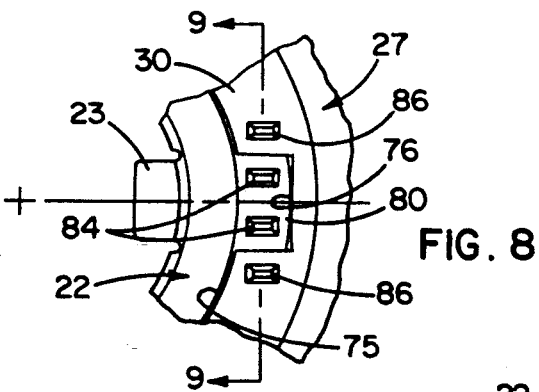
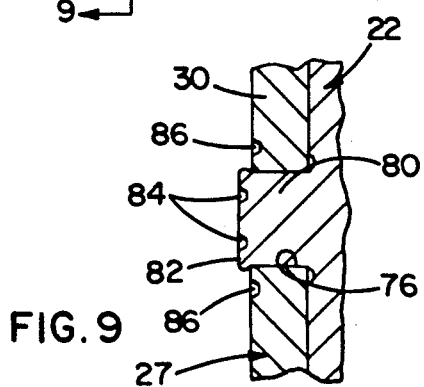

CLUTCH WITH SPACER FOR SUPPORTING A BEARING

BACKGROUND OF THE INVENTION

This invention relates generally to a clutch and, more particularly, to a clutch for selectively transmitting torque from a rotatable drive shaft to a rotatable output member. The clutch of the invention is especially adapted for use with a lawnmower, a garden tractor or the like to enable selective engagement of an implement drive (e.g., a mower blade drive).

Prior clutches of this type include an input hub which is keyed to and rotated by the drive shaft of the implement. A bearing is supported on the input hub and rotatably supports the output member (e.g., a pulley for a belt drive). Clutch means, preferably of the electromagnetic type, selectively couple the input hub to or uncouple the input hub from the output member. The electromagnetic clutch means include a rotor coupled to the input hub, an armature associated with the output member, and electromagnetic means for selectively attracting the armature into frictional engagement with the rotor.

The bearing which is supported on the input hub and which supports the output member is captivated axially between the hub and a tubular spacer which is keyed to the hub. A screw extends through the spacer and the hub and is threaded into the drive shaft. When tightened, the screw causes the bearing to be clamped axially between the spacer and the hub. Because the bearing is supported on the input hub which, in turn, is supported on the drive shaft, the clutch requires a relatively large bearing with a relatively large inside diameter to accommodate the input hub. A large bearing is comparatively expensive and requires the use of a larger and more expensive output member.

SUMMARY OF THE INVENTION

The general aim of the present invention is to provide a clutch of the foregoing general type in which the inner diameter of the bearing for the output member is substantially the same as the diameter of the drive shaft so as to enable the use of a smaller and less costly bearing and output member.

A more detailed object of the invention is to achieve the foregoing by supporting the bearing radially on the same spacer which traps the bearing axially against the input hub, the spacer being telescoped both into the hub and into the bearing.

The invention also resides in the provision of relatively simple and reliable means for connecting the input hub to the magnetic rotor of the clutch.

These and other objects and advantages of the invention will become more apparent from the following detailed description when taken in conjunction with the accompanying drawings.

BRIEF DESCRIPTION OF THE DRAWINGS

FIG. 2 is an exploded perspective view of certain components of the clutch.

FIG. 6 is a fragmentary bottom plan view as seen substantially along the line 6—6 of FIG. 1.

FIG. 7 is a cross-section, on a reduced scale, of the hub and rotor shown in FIG. 1.

FIG. 8 is an enlarged fragmentary bottom plan view as seen along the line 8—8 of FIG. 7.

FIG. 9 is a fragmentary cross-section taken substantially along the line 9—9 of FIG. 8.

DETAILED DESCRIPTION OF THE PREFERRED EMBODIMENT

Figure 1:
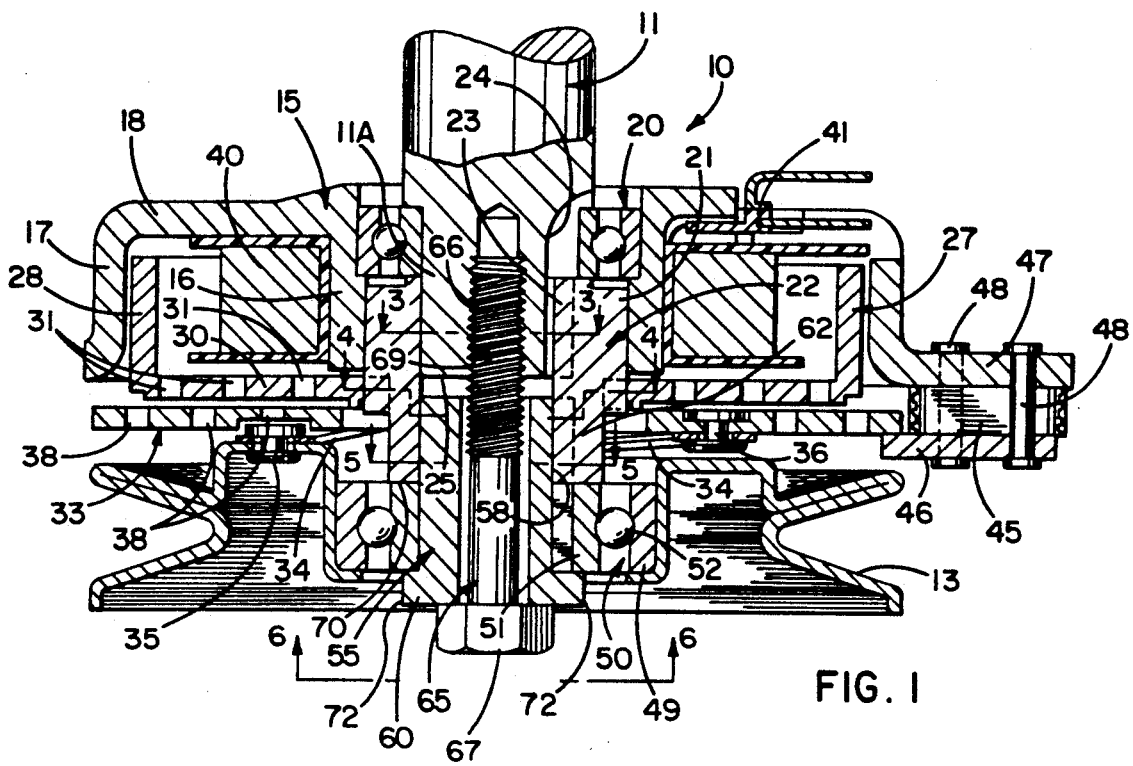
FIG. 1 is a section view taken axially through a new and improved clutch incorporating the unique features of the present invention.

For purposes of illustration, the invention has been shown in the drawings as embodied in an electromagnetic coupling and specifically in a clutch/brake unit 10. While the unit has many applications it is especially adapted for use in conjunction with the engine of a riding lawnmower or garden tractor. The engine includes a downwardly projecting drive shaft 11 which forms an input shaft for the clutch/brake unit 10, the drive shaft having a reduced diameter lower end portion 11A. The output member of the unit herein is in the form of a pulley 13 adapted to be rotated by the shaft and adapted to be connected by a belt to a mower blade drive or other driven device.

In many respects, the clutch/brake unit 10 is similar to that of Pardee U.S. Pat. No. 5,119,918, the disclosure of which is incorporated herein by reference. The clutch/brake unit includes a rotationally fixed field member or shell 15 of inverted U-shaped cross-section, the shell including inner and outer pole rings 16 and 17 connected by a top section 18. An upper bearing 20 is trapped axially between shoulders on the shaft 11 and within the inner pole ring 16 and supports the shaft to rotate within the field shell.

Figure 3:
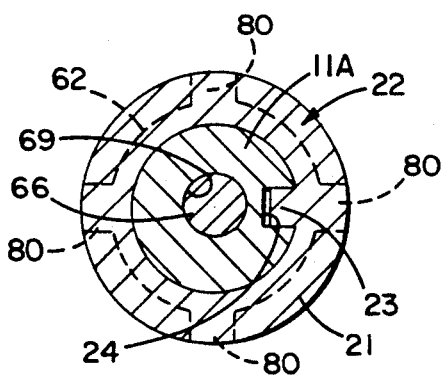
FIGS. 3, 4 and 5 are cross-sections taken substantially along the lines 3—3, 4—4 and 5—5, respectively, of FIG. 1.
Figure 4:
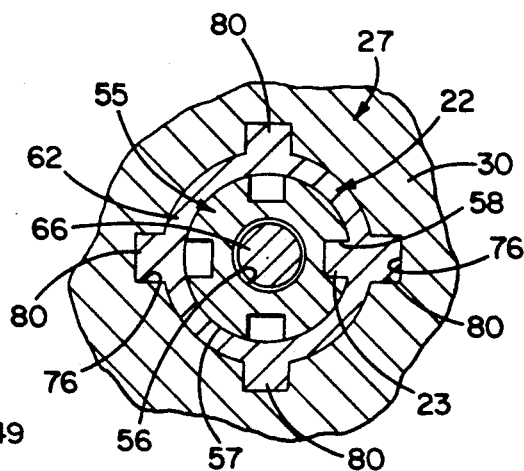
Figure 5:
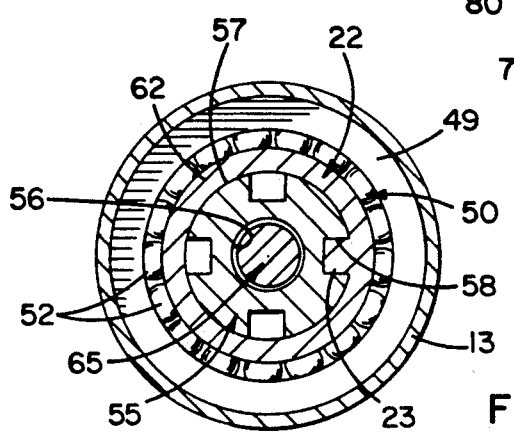

The enlarged diameter upper end portion 21 (FIG. 2) of a tubular input hub 22 is located within the field shell 15 immediately below the bearing 20. The input hub 22 preferably is made of powdered metal and its inner periphery is formed with an integral key 23 (FIGS. 1-5) which projects radially inwardly from the hub. The key extends the entire length of the hub and its upper end portion fits into an axially extending keyway 24 (FIGS. 1-3) formed in the outer peripheral surface of the lower end portion 11A of the shaft 11 and opening downwardly out of the axially facing lower end 25 of the shaft. By virtue of the interfitting key 23 and keyway 24, the input hub 22 is coupled to rotate with the shaft 11.

Secured to the input hub 22 is a rotor 27 having a pole ring 28 disposed with rotatable clearance within the field shell 15 adjacent the outer pole ring 17 thereof. The rotor includes a lower friction disc 30 formed integrally with the lower end of the pole ring 28 and connected to rotate with the input hub 22. Formed through the disc 30 is a plurality of radially spaced rows of angularly spaced slots 31. In this particular instance, there are three concentric rows of slots formed in the disc.

Coacting with the rotor 27 is an armature 33 (FIG. 1) which is connected to rotate with and move axially relative to the output pulley 13. For this purpose, three angularly spaced leaf springs 34 are located between the pulley and the armature, one end portion of each spring being secured to the pulley by a rivet 35 while the opposite end portion of each spring is connected to the armature by a rivet 36. The springs transmit torque from the armature to the pulley and allow the armature to shift axially relative to the pulley and toward and away from the disc 30 of the rotor 27.

Radially spaced rows of angularly spaced slots 38 (FIG. 1) also are formed through the armature 33. Herein, there are three rows of slots 38 with one row being located between the inner and center rows of slots 31 in the rotor disc 30, with the next row being located between the center and outer rows of slots 31 in the rotor disc, and with the final row located radially outwardly of the outer row of slots 31 in the rotor disc.

A coil 40 formed by a multiple turn winding is disposed within the field shell 15 between the inner and outer pole rings 16 and 17 thereof and is connected electrically to a terminal block 41 which, in turn, is adapted to be connected to a voltage source such as the battery of the riding mower or tractor. When the coil is energized, magnetic flux is produced and threads a circuit through the field shell 15, the rotor 27 and the armature 33. Specifically, flux threads from the outer pole ring 17 of the field shell 15 and across a radial air gap to the pole ring 28 of the rotor 27, cuts back and forth several times across an axial air gap between the rotor friction disc 30 and the armature 33, and then threads from the friction disc to the upper end portion 21 of the hub 22 and finally to the inner pole ring 16 of the field shell. Such flux attracts the armature 33 into engagement with the rotor disc 30 and causes the armature and the output pulley 13 to rotate in unison with the rotor 27 and the input hub 22. The springs 34 permit the armature to move axially into engagement with the rotor and act to transmit torque from the armature to the pulley. Upon de-energization of the coil 40, the springs apply a force tending to pull the armature out of engagement with the rotor disc. When the armature is in its clutch-disengaged position shown in FIG. 1, the input hub 22 and the rotor 27 turn without driving the armature 33 and the pulley 13.

When the clutch is disengaged, it is necessary to bring the output pulley 13 to a complete stop in a relatively short period of time (e.g., three seconds). Braking is achieved by means of two permanent magnets 45, only one of which has been shown in FIG. 1. The permanent magnet is located between a lower pole piece 46 and an overlying flange 47 on the field shell 15 and is held in place by rivets 48 which also serve to attach the pole piece securely to the flange. When the coil 40 is deenergized and the clutch is disengaged, the permanent magnet flux creates a force attracting the armature 33 downwardly into engagement with the pole piece 46, the latter applying a braking torque to the armature. Reference may be had to the aforementioned Pardee patent for a more detailed disclosure of the structure for producing the braking torque.

As shown most clearly in FIG. 1, the output pulley 13 is supported to rotate with the outer race 49 of a ball bearing 50 having an inner race 51 and having an annular row of bearing balls 52 located between the two races. In accordance with the primary aspect of the present invention, the inner race 51 of the bearing 50 has approximately the same inner diameter as the diameter of the lower end portion 11A of the shaft 11 and is uniquely supported along its entire length on a tubular spacer 55 which is telescoped into and keyed to the input hub 22. As a result of supporting the bearing 50 radially on the spacer 55, the diameters of the bearing and the output pulley 13 are reduced so as to save cost.

More specifically, the spacer 55 is a tubular member having a cylindrical inner bore 56 and a generally cylindrical outer peripheral surface 57. Four angularly spaced and axially extending keyways 58 are formed in the outer peripheral surface 57 of the spacer and open upwardly out of the upper end thereof. An enlarged radially extending flange 60 is formed at the lower end of the spacer. The outer diameter of the spacer is substantially the same as the diameter of the lower end portion 11A of the shaft 11 and as the inner diameter of the hub 22. Preferably, the spacer is formed of powdered metal.

The cylindrical inner race 51 of the bearing 50 is received with a close fit on the cylindrical outer peripheral surface 57 of the spacer 55 and rests against the upper side of the flange 60. The axial length of the outer peripheral surface 57 of the spacer 55 is greater than the axial length of the inner bearing race 51 and thus the inner race is radially supported along its entire length by the spacer. As is apparent, the inner diameter of the inner bearing race 51 is about the same as the diameter of the lower end portion 11A of the shaft 11.

The spacer 55, with the bearing 50 seated on the flange 60, is telescoped upwardly into a reduced lower diameter portion 62 of the input hub 22. As an incident to telescoping of the spacer 55 into the hub 22, one of the keyways 58 in the spacer moves into interfitting relation with the key 23 in the hub and thus couples the spacer for rotation in unison with the hub and the shaft 11.

A bolt 65 is used to hold the hub 22, the bearing 50 and the spacer 55 in assembled relation with the shaft 11. Herein, the bolt includes an upper threaded shank portion 66 and a lower driving head 67, the latter being hexagonal in shape. The head 67 of the bolt 65 underlies the flange 60 of the spacer 55 while the threaded shank portion 66 is screwed into an axially extending threaded hole 69 (FIGS. 1 and 3) formed in the shaft 11 and opening downwardly out of the downwardly facing lower end 25 thereof. When the bolt 65 is tightened, the head 67 acts against the lower side of the flange 60 and causes the inner bearing race 51 to be clamped axially between the upper side of the flange and the downwardly facing lower end 70 (FIG. 1) of the input hub 22. It will be noted that there is only axial engagement between the inner bearing race 51 and the input hub 22 and that the bearing race is not supported radially on the outer peripheral surface of the input hub. Radial support for the inner bearing race is provided solely by the outer peripheral surface 57 of the spacer 55 thereby permitting the inner diameter of the inner race to be approximately the same as the diameter of the shaft portion 11A and enabling the use of a relatively small and inexpensive bearing.

Advantageously, two wrenching flats 72 are formed on diametrically opposite sides of the flange 60. When the bolt 65 is tightened by one wrench in engagement with the head 67, a second wrench may be applied to the wrenching flats 72 of the flange 60. By holding the second wrench, the spacer 55, the hub 22 and the shaft 11 may be prevented from rotating as the bolt is tightened. This facilitates tightening of the bolt to a preset torque.

It should be appreciated that the principles of the invention are applicable equally well to an inverted clutch in which the field member or shell 15 is mounted on the spacer-supported bearing 50 and in which the output member or pulley 13 is mounted on the bearing 20. In such an instance, the relative small diameter bearing 50 enables the use of a smaller diameter field shell and a smaller diameter and lower cost coil 40 than would be the case if the bearing 50 were supported on the hub 22.

According to another aspect of the invention, the input hub 22 is connected to the rotor disc 30 in a manner which facilitates quick and easy assembly of those components. For this purpose, the rotor disc 30 is formed with a central hole 75 (FIG. 2) for receiving the reduced lower portion 62 of the hub 22. A plurality (e.g., four) of angularly spaced notches 76 is formed axially through the disc 30 adjacent the hole 75 and open radially inwardly into the hole.

Four angularly spaced lugs 80 (FIGS. 2 and 4) are formed integrally with and project downwardly from the lower end of the enlarged diameter portion 21 of the input hub 22. The hub is assembled to the rotor disc 30 by inserting the lugs 80 through the notches 76 and then by enlarging the ends 82 (FIG. 9) of the lugs with a swaging operation to captivate the lugs axially in the notches. Specifically, the lugs are swaged by staking the lower end of each lug at two angularly spaced locations as indicated at 84 in FIGS. 8 and 9 to cause the angular width of the end of the lug to expand to a dimension greater than the angular width of the respective notch 76. Preferably, the disc 30 is also staked on each side of each notch as indicated at 86 in order to crowd the side edges of the notch against the lug. This manner of connecting the disc 30 to the hub 22 lends itself to high speed and highly automated assembly techniques.

I claim:

1. The combination of, a clutch and a rotatable drive shaft, said shaft having an end portion of predetermined diameter, said end portion of said shaft having an axially facing end, having an axially extending threaded hole opening out of said axially facing end, and having an outer peripheral surface with an axially extending keyway opening out of said axially facing end, said clutch comprising a tubular input hub telescoped onto said shaft end portion and having an integral key interfitting with said keyway to couple said hub for rotation with said shaft, said hub having an axially facing end and having an outer peripheral surface, a spacer telescoped into said hub and having a radially extending flange spaced axially from said axially facing end of said hub, said spacer having a generally cylindrical outer peripheral surface with an axially extending and axially opening keyway interfitting with said key to couple said spacer for rotation with said hub, a bearing having an inner rae supported on said outer peripheral surface of said spacer and located between said flange and said axially facing end of said hub, said bearing being free of the outer peripheral surface of said hub, an output member mounted on said bearing and supported by said bearing for rotation relative to said spacer and said hub, means selectively operable to couple said output member for rotation with said hub or to enable said hub to rotate relative to said output member, a screw having a threaded shank and having a driving head on one end of said shank, said shank being threaded into said hole in said shaft, said head being operable, upon tightening of said screw, to act against said flange and cause said bearing to be clamped axially between said flange and said axially facing end of said hub, and wrenching surfaces on said spacer and engageable by a wrenching tool during tightening of said screw whereby the wrenching tool coacts with said spacer and said hub to prevent said shaft from turning as said screw is tightened.

2. The combination defined in claim 1 in which the inner race of said bearing is supported radially by said spacer along the entire axial length of said bearing.

3. The combination defined in claim 1 in which the inner diameter of said hub, the outer diameter of said spacer and the inner diameter of the inner race of said bearing are all substantially the same dimension, said dimension being approximately equal to the diameter of said end portion of said shaft.

4. The combination defined in claim 1 in which said means comprise a rotor disc having a central hole receiving said hub, and means connecting said rotor disc for rotation with said hub, said connecting means comprising a plurality of angularly spaced notches formed axially through said disc and opening radially into said central hole, a plurality of angularly spaced lugs formed integrally with said hub and projecting through said notches, said lugs having swaged ends retaining said hub and said rotor disc in axially assembled relation.

5. The combination defined in claim 3 in which said rotor disc includes staked surfaces causing the edges of said notches to crowd against and tightly engage said lugs after said lugs have been inserted through said notches.

6. The combination of, a clutch and a rotatable drive shaft, said shaft having an end portion of predetermined diameter, said end portion of said shaft having an axially facing end, having an axially extending threaded hole opening out of said axially facing end, and having an outer peripheral surface with an axially extending keyway opening out of said axially facing end, said clutch comprising a tubular input hub telescoped onto said shaft end portion and having an integral key interfitting with said keyway to couple said hub for rotation with said shaft, said hub having an axially facing end and having an outer peripheral surface, a spacer telescoped into said hub and having a radially extending flange spaced axially from said axially facing end of said hub, said spacer having a generally cylindrical outer peripheral surface with an axially extending and axially opening keyway interfitting with said key to couple said spacer for rotation with said hub, a bearing having an inner race supported on said outer peripheral surface of said spacer and located between said flange and said axially facing end of said hub, said bearing being free of the outer peripheral surface of said hub, means having an electromagnetic field member and an output member, one of said members being mounted on said bearing and being supported by said bearing for rotation relative to said spacer and said hub, said means being selectively operable to couple said output member for rotation with said hub or to enable said hub to rotate relative to said output member, a screw having a threaded shank and having a driving head on one end of said shank, said shank being threaded into said hole in said shaft, said head being operable, upon tightening of said screw, to engage said flange and cause said bearing to be clamped axially between said flange and said axially facing end of said hub, and wrenching surfaces on said spacer and engageable by a wrenching tool during tightening of said screw whereby the wrenching tool coacts with said spacer and said hub to prevent said shaft from turning as said screw is tightened.

* * * * *